United States Patent
Fujii (10) Patent No.: US 9,052,706 B2
(45) Date of Patent: Jun. 9, 2015

(54) DEVICE INFORMATION DISPLAY APPARATUS, STORAGE DEVICE STORING DEVICE INFORMATION DISPLAY PROGRAM, AND DEVICE INFORMATION DISPLAY METHOD

(75) Inventor: Hideyuki Fujii, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 518 days.

(21) Appl. No.: 13/347,804

(22) Filed: Jan. 11, 2012

(65) Prior Publication Data

US 2012/0185065 A1   Jul. 19, 2012

(30) Foreign Application Priority Data

Jan. 13, 2011   (JP) ................ P2011-004750

(51) Int. Cl.
G05B 15/00 (2006.01)
G05B 11/01 (2006.01)
G05B 19/409 (2006.01)
G05B 15/02 (2006.01)

(52) U.S. Cl.
CPC .............. G05B 19/409 (2013.01); G05B 15/02 (2013.01)

(58) Field of Classification Search
CPC .................... G05B 19/409; G05B 2219/23067
USPC .......................................................... 700/83
See application file for complete search history.

(56) References Cited

U.S. PATENT DOCUMENTS

| | | | | |
|---|---|---|---|---|
| 7,237,240 B1 * | 6/2007 | Chen et al. | ..................... | 718/100 |
| 2005/0182979 A1 * | 8/2005 | Gross et al. | ..................... | 713/300 |
| 2007/0077665 A1 * | 4/2007 | Bump et al. | ..................... | 438/14 |
| 2007/0239351 A1 * | 10/2007 | Sherrill et al. | ................. | 701/207 |
| 2007/0282463 A1 * | 12/2007 | Hodson et al. | ................. | 700/20 |
| 2009/0125130 A1 * | 5/2009 | Eldridge et al. | ................ | 700/87 |

FOREIGN PATENT DOCUMENTS

| | | |
|---|---|---|
| EP | 2012205 A2 | 1/2009 |
| JP | 63228314 A | 9/1988 |
| JP | 2006-252145 A | 9/2006 |
| JP | 2007249312 A | 9/2007 |
| JP | 2010-79384 A | 4/2010 |

OTHER PUBLICATIONS

Extended European Search Report dated Jul. 6, 2012 issued in corresponding European Patent Application No. 12150679.4.
Emerson Process Management: "FDT/DTM, and Enhanced EDDL, what's best for the user" dated 2008 XP 002678587.
Japanese Office Action corresponding to Japanese Patent Application No. 2011-004750, dated Dec. 4, 2012.

* cited by examiner

Primary Examiner — Mohammad Ali
Assistant Examiner — Yuhui R Pan
(74) Attorney, Agent, or Firm — Sughrue Mion, PLLC (57) ABSTRACT

A device information display apparatus that communicates with a field device and acquires a device information of the field device to display the device information on a display device, the device information display apparatus may include: a changing unit that changes the device information to be displayed on the display device, the changing being performed based on operation instructions received from an input device; a definition file generation unit that generates a definition file for prescribing the device information to be displayed on the display device, the generating being performed based on the device information changed by the changing unit; and a switching unit that switches the device information to be displayed on the display device, the switching being performed based on the definition file generated by the definition file generation unit.

20 Claims, 7 Drawing Sheets

DEVICE INFORMATION DISPLAY APPARATUS, STORAGE DEVICE STORING DEVICE INFORMATION DISPLAY PROGRAM, AND DEVICE INFORMATION DISPLAY METHOD

BACKGROUND OF THE INVENTION

1. Field of the Invention

The present invention relates to a device information display apparatus for displaying device information of a field device, a device information display program, and a computer-readable storage device storing the program.

Priority is claimed on Japanese Patent Application No. 2011-004750, filed Jan. 13, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In the related art, in order to perform an advanced automatic operation, a distributed control system (DCS), in which site devices (measuring instruments, operators) called field devices and a device management apparatus for managing and controlling the site devices are connected to each other through a communication bus, has been configured in a plant, a factory or the like. In such a plant, field devices provided from various makers have been installed in many cases. However, if field devices with different specifications are provided, managing the field devices is difficult. In this regard, in the related art, the difference in the specifications of the field devices provided from various makers is absorbed using an electronic device description language (EDDL), which is a language for describing the characteristics or attributes of field devices, resulting in the realization of unified management.

Here, the maintenance of the field devices installed in the plant and the like have been performed by operators regularly or irregularly in order to prevent an abnormal operation, maintain measurement accuracy and the like. In many cases, the maintenance of the field devices has been performed using a portable terminal apparatus such as a computer or a personal digital assistant (PDA) provided with a dedicated tool (a field device setting tool) for setting or adjusting the field device. Even in the field device setting tool, the above-mentioned EDDL is used in order to recognize the characteristics or attributes of field devices to be subject to maintenance.

In detail, when the maintenance of a field device is performed, a operator connects the field device to be subject to maintenance to the portable terminal apparatus provided with the field device setting tool using a cable (for example, a universal serial bus (USB) cable). Next, the operator operates the portable terminal apparatus to acquire device information (parameters) from the field device and allow the acquired device information to be displayed on the portable terminal apparatus. Then, according to necessity, the operator operates the portable terminal apparatus to change the device information with reference to the device information displayed on the portable terminal apparatus. Thereby, the operator gives a setting instruction of the device information for the field device. In this way, setting or adjustment is variously performed for the field device.

Japanese Unexamined Patent Application, First Publication No. 2010-79384 discloses a device information display apparatus capable of displaying device information of a field device in a multi-window environment while conforming to an enhanced electronic device description (e-EDD) standard. Japanese Unexamined Patent Application, First Publication No. 2006-252145 discloses a device information display apparatus that displays device information according to a template for prescribing the display method of the device information. United States Patent Application, Publication No. 2007-0077665 discloses technology capable of changing a user interface through a tool using device type manager (DTM) technology.

In Japanese Unexamined Patent Application, First Publication No. 2010-79384, the device information is displayed using a device description (DD) file prepared by a vendor of the field device. In the DD file, since a display menu has also been defined in addition to all characteristics or attributes of a field device provided by the vendor, the number of pieces of device information to be displayed is enormous. Therefore, since time is required until device information to be referred to by a user is reached, operability is deteriorated. Furthermore, since the number of pieces of the device information to be displayed is enormous, for example, even when names are the same as one another, an abnormal operation, such as erroneous reference of device information, may occur with different characteristics or attributes.

In Japanese Unexamined Patent Application, First Publication No. 2006-252145, it is possible to change the display method of the device information. However, it is necessary to describe a template for prescribing the display method in a text format, causing problems in usability. In US Patent Application Publication No. 2007-0077665, the user interface is graphically modifiable. However, since it does not conform to the EDD standard and the structure of the display menu has been defined in an independent format, it lacks general versatility and expandability.

Here, if a source file for defining a display menu prescribed in the EDD standard is directly modified using an editor and the like, it may be possible to display only device information that needs to be displayed. However, since the source file is extremely complicated and time and troublesome work are required in order to modify the source file, it is not realistic. Furthermore, for a field device provided by a vendor and not disclosing the source file, it is difficult to change a display menu. It may also be possible for a vendor to prescribe device information to be displayed. However, since optimal device information to be displayed depends on applications of a user, it is not realistic for the vendor to cope with such things.

SUMMARY

The present invention provides a device information display apparatus capable of easily changing device information to be displayed according to a user's request to improve operability, a device information display program, and a computer-readable storage device storing the program.

A device information display apparatus communicates with a field device and acquires a device information of the field device to display the device information on a display device. The device information display apparatus may include: a changing unit that changes the device information to be displayed on the display device, the changing being performed based on operation instructions received from an input device; a definition file generation unit that generates a definition file for prescribing the device information to be displayed on the display device, the generating being performed based on the device information changed by the changing unit; and a switching unit that switches the device information to be displayed on the display device, the switching being performed based on the definition file generated by the definition file generation unit.

The device information display apparatus may further include: an analysis unit that analyzes reference frequency of the device information displayed on the display device. The changing unit may change the device information to be displayed on the display device, the changing being performed based on an analysis result of the analysis unit.

The device information display apparatus may further include: a search unit that searches for the device information to be displayed on the display device; and a search result management unit that manages a search result of the search unit. The changing unit may change the device information to be displayed on the display device, the changing being performed based on the search result managed by the search result management unit.

The device information display apparatus may further include: a display menu creation unit that creates a display menu file by using the definition file generated by the definition file generation unit, the display menu file prescribing the device information in order to display the device information, which has been acquired by communicating with the field device, on the display device provided in another device.

The device information display apparatus may further include: a communication unit that acquires the device information by controlling a communication device to communicate with the field device.

The device information display apparatus may further include: a storage device that stores an EDDL file, which is a text formation file that describes the device information of the field device and is capable of hierarchically defining the device information based on characteristics or attributes of the field device, a DD file, which is obtained by converting the EDDL file into a binary format file treatable in the device information display apparatus, and the definition file.

The storage device may store the EDDL file, the DD file and the definition file in different areas respectively and manages the EDDL file, the DD file and the definition file.

The device information display apparatus may further include: a tokenizer that creates the DD file from the EDDL file.

The storage device may store the display menu file, and the tokenizer may create the DD file from the display menu file.

The display device may display a window comprising: a tree display area that displays function blocks of the field device as a list with a tree format; a parameter display area that displays names and values of parameters of function blocks selected by a user's operation from the function blocks displayed as the list in the tree display area as a list; a mode switching button that is used to switch an operation mode of the parameter display area; a parameter acquisition button that is used to instruct parameter acquisition from the field device; and a parameter setting button that is used to instruct parameter setting for the field device.

A computer-readable storage device storing a device information display program may cause a computer to serve as: a display means that displays a device information acquired by communicating with a field device on a display device; a changing means that changes the device information to be displayed on the display device, the changing being performed based on operation instructions received from an input device; a definition file generation means that generates a definition file for prescribing the device information to be displayed on the display device, the generating being performed based on the device information changed by the changing means; and a switching means that switches the device information to be displayed on the display device, the switching being performed based on the definition file generated by the definition file generation means.

A device information display method of communicating with a field device and acquiring a device information of the field device to display the device information on a display device may include: changing the device information to be displayed on the display device, the changing being performed based on operation instructions received from an input device; generating a definition file for prescribing the device information to be displayed on the display device, the generating being performed based on the device information that has been changed; and switching the device information to be displayed on the display device, the switching being performed based on the definition file that has been generated.

The device information display method may further include: analyzing reference frequency of the device information displayed on the display device; and changing the device information to be displayed on the display device, the changing being performed based on an analysis result of the analyzing.

The device information display method may further include: searching for the device information to be displayed on the display device; managing a search result of the searching; and changing the device information to be displayed on the display device, the changing being performed based on the search result that is managed.

The device information display method may further include: creating a display menu file by using the definition file that has been generated, the display menu file prescribing the device information in order to display the device information, which has been acquired by communicating with the field device, on the display device provided in another device.

The device information display method may further include: storing an EDDL file, which is a text formation file that describes the device information of the field device and is capable of hierarchically defining the device information based on characteristics or attributes of the field device, a DD file, which is obtained by converting the EDDL file into a binary format file treatable in the device information display apparatus, and the definition file.

The device information display method may further include: storing an EDDL file, which is a text formation file that describes the device information of the field device and is capable of hierarchically defining the device information based on characteristics or attributes of the field device, a DD file, which is obtained by converting the EDDL file into a binary format file treatable in the device information display apparatus, and the definition file in different areas respectively.

The device information display method may further include: creating the DD file from the EDDL file.

The device information display method may further include: storing the display menu file; and creating the DD file from the display menu file.

The device information display method may further include: displaying function blocks of the field device as a list with a tree format; displaying names and values of parameters of function blocks selected by a user's operation from the function blocks, which are displayed as the list, as a list; switching an operation mode of the displaying as the list; instructing parameter acquisition from the field device; and instructing parameter setting for the field device.

According to the present invention, the device information to be displayed on the display device is modified by the changing unit according to an operation instruction for device information displayed on the display device, the definition file for prescribing the device information to be displayed on the display device is generated by the definition file generation unit based on the changed content, and the device information to be displayed on the display device is switched by the switching unit based on the generated definition file.

According to the present invention, the device information to be displayed on the display device is changed according to an operation instruction for device information displayed on the display device, the definition file for prescribing the device information to be displayed on the display device is generated based on the changed content, and the device information to be displayed on the display device is switched based on the generated definition file. Consequently, it is possible to easily change device information to be displayed according to a user's request, resulting in the improvement of operability.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

First Preferred Embodiment

Figure 1:
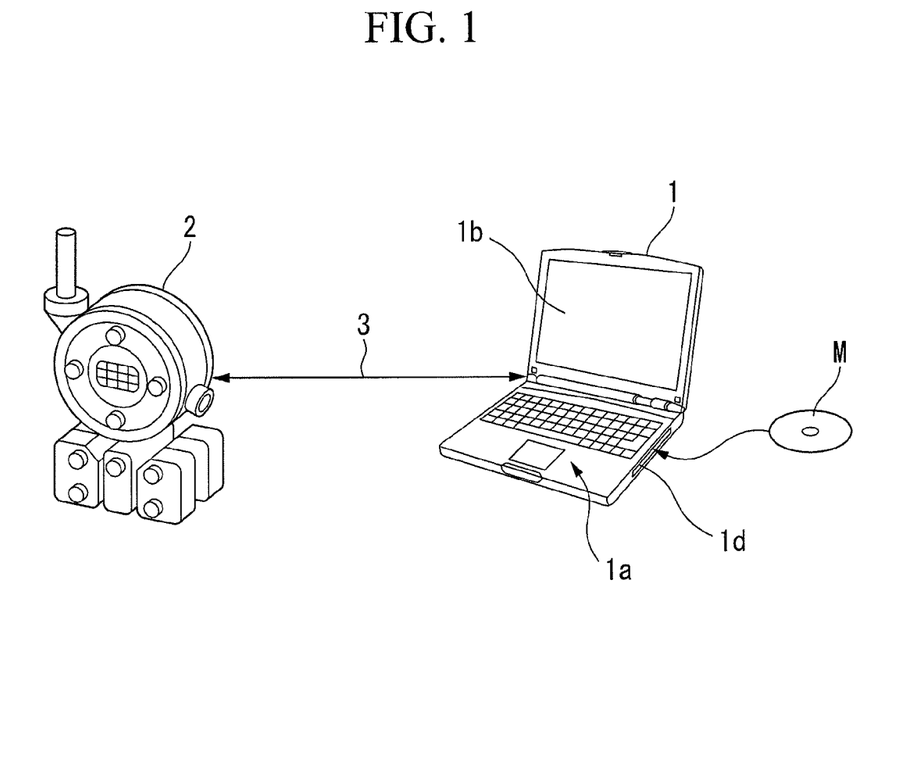
FIG. 1 is a diagram illustrating the external appearance of a device information display apparatus in accordance with a first preferred embodiment of the present invention.

FIG. 1 is a diagram illustrating the external appearance of a device information display apparatus in accordance with a first preferred embodiment of the present invention. As illustrated in FIG. 1, a device information display apparatus 1 in accordance with the first preferred embodiment of the present invention is connected to a field device 2 through a communication cable 3, wherein the field device 2 is installed in a plant or a factory. The device information display apparatus 1 communicates with the field device 2 through the communication cable 3 to acquire device information (parameters) of the field device 2 and to display the acquired parameters.

The field device 2, for example, includes a sensor device such as a flowmeter or a temperature sensor, a valve device such as a flow control value or an on-off valve, an actuator device such as a fan or a motor, and other devices installed at a field of a plant or a factory. A plurality of field devices 2 are installed in the plant and the like, are connected to communication buses installed at the plant and the like, and are unitarily managed by management apparatuses connected to the communication buses.

The device information display apparatus 1, for example, is implemented with a note-type personal computer including an input device 1a such as a keyboard or a pointing device, a display device 1b such as a liquid crystal display device, a communication device 1c (not illustrated in FIG. 1, refer to FIG. 2), a drive device 1d, and the like. The drive device 1d, for example, reads data stored in a computer-readable storage device M such as a CD-ROM or a DVD-ROM. The functions (the function of communicating with the field device 2, the function of displaying the parameters acquired from the field device 2, and the like) of the device information display apparatus 1 are performed by software by reading and installing a program (a device information display program) stored in the storage device M through the drive device 1d.

Figure 2:
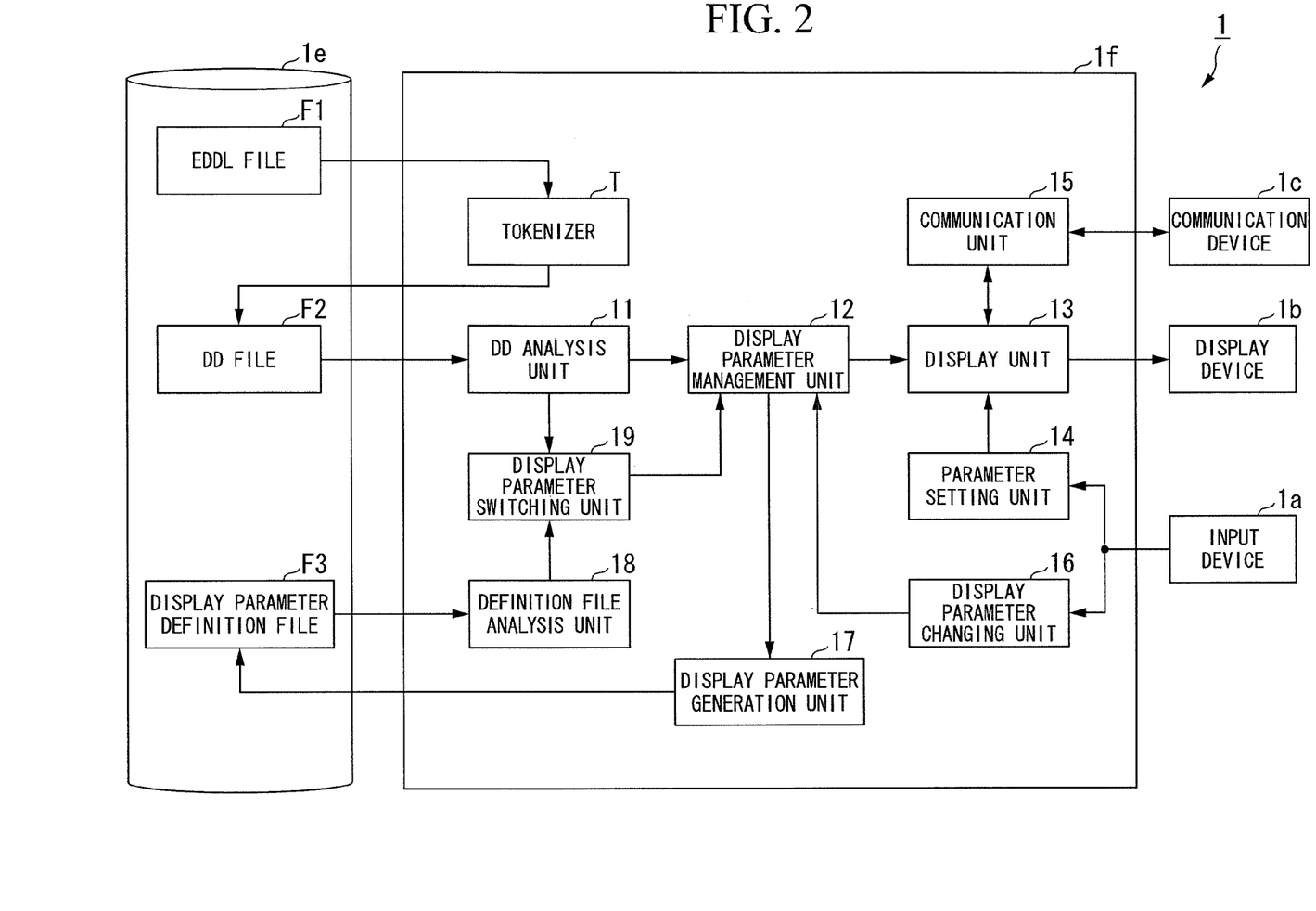
FIG. 2 is a block diagram illustrating a configuration of main elements of the device information display apparatus in accordance with the first preferred embodiment of the present invention.

FIG. 2 is a block diagram illustrating a configuration of main elements of the device information display apparatus in accordance with the first preferred embodiment of the present invention. As illustrated in FIG. 2, the device information display apparatus 1 of the first preferred embodiment of the present invention includes a storage device 1e and a processing device 1f, in addition to the input device 1a, the display device 1b, the communication device 1c, and the drive device 1d illustrated in FIG. 1. The storage device 1e, for example, is an external storage device such as a hard disk. The storage device 1e stores the program installed after being read from the storage device M through the drive device 1d, and various files such as an EDDL file F1, a DD file F2, and a display parameter definition file F3 (a definition file).

In the EDDL file F1, various parameters indicating the characteristics or attributes of the field device 2 have been described using a language called an EDDL. The EDDL file F1 is a text formation file capable of hierarchically defining parameters according to the characteristics or attributes of the field device 2. The EDDL file F1 is provided from a vendor and the like of the field device 2. The DD file F2 is obtained by converting the EDDL file F1 into a binary format file treatable in the device information display apparatus 1. In the display parameter definition file F3, parameters to be displayed on the display device 1b have been prescribed. The display parameter definition file F3 is generated by a display parameter generation unit 17 which will be described later.

The processing device 1f, for example, is a central processing unit (CPU) and integrally controls the operation of the device information display apparatus 1. The processing device 1f reads and executes the program stored in the storage device 1e, thereby performing the functions of a tokenizer T, a DD analysis unit 11, a display parameter management unit 12 (a changing unit/changing means), a display unit 13 (a display means), a parameter setting unit 14, a communication unit 15, a display parameter changing unit 16 (a changing unit/changing means), the display parameter generation unit 17 (a definition file generation unit/definition file generation means), a definition file analysis unit 18, and a display parameter switching unit 19 (a switching unit/switching means).

The tokenizer T is activated by a user's instruction to generate the DD file F2 from the EDDL file F1. The tokenizer T has a function of a compiler. After the DD file F2 is generated from the EDDL file F1 by the tokenizer T, the tokenizer T is activated only when the content of the EDDL file F1 is changed or a new EDDL file F1 is added.

The DD analysis unit 11 reads and analyzes the DD file F2 stored in the storage device 1e to access the parameters (device information) of the field device 2. The DD analysis unit 11 is provided from a Fieldbus Foundation and the like as a library.

The display parameter management unit 12 manages parameters to be displayed on the display device 1b. In detail, the display parameter management unit 12 manages the structure of menus of the parameters to be displayed on the display device 1b and a list of the parameters to be displayed on the display device 1b, according to the definition of the EDDL file F1 (the DD file F2).

The display unit 13 graphically displays a menu tree hierarchically indicating the menus of the parameters on the display device 1b, and a list of parameters selected in the menu tree, based on the parameters (device information) managed by the display parameter management unit 12. In response to an operation signal output from the input device 1a, the parameter setting unit 14 changes values of the parameters displayed on the display device 1b by the display unit 13. The communication unit 15 controls the communication device 1c to communicate with the field device 2, thereby acquiring various parameters from the field device 2 or performing parameter setting for the field device 2.

In response to the operation signal outputted from the input device 1a, the display parameter changing unit 16 changes the parameters managed by the display parameter management unit 12, thereby changing the parameters to be displayed on the display device 1b. In detail, in response to the operation signal from the input device 1a, the display parameter changing unit 16 cuts, copies, and pastes the parameters (not the values of the parameters, but the parameter items) graphically displayed on the display device 1b. Through the display parameter changing unit 16, it is possible for a user to graphically edit parameters.

The display parameter generation unit 17 acquires information indicating the parameters changed by the display parameter changing unit 16 from the display parameter management unit 12, and generates the display parameter definition file F3 having prescribed changed parameters to be displayed on the display device 1b. The definition file analysis unit 18 reads the display parameter definition file F3 stored in the storage device 1e and analyzes the parameters prescribed in the display parameter definition file F3. The display parameter switching unit 19 generates data for displaying parameters changed by a user to output the data to the display parameter management unit 12 based on the analysis result of the DD analysis unit 11 and the analysis result of the definition file analysis unit 18, thereby switching the parameters displayed on the display device 1b.

Figure 3:
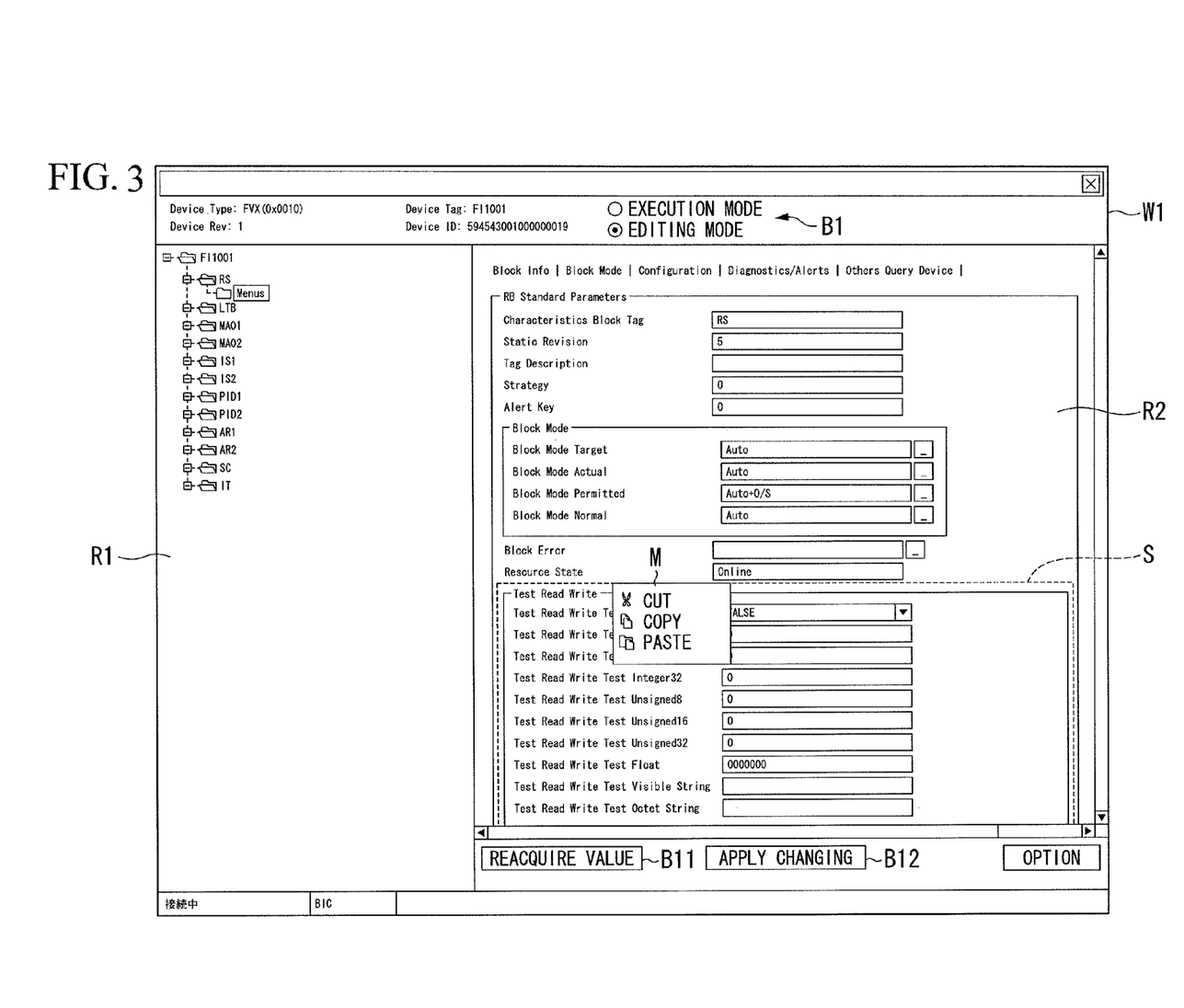
FIG. 3 is a diagram illustrating an example of the display content of the device information display apparatus in accordance with the first preferred embodiment of the present invention.

Next, a display example of parameters will be described. FIG. 3 is a diagram illustrating an example of the display content of the device information display apparatus in accordance with the first preferred embodiment of the present invention. As illustrated in FIG. 3, a window W1 displayed on the display device 1b of the device information display apparatus 1 includes a tree display area R1, a parameter display area R2, a mode switching button B1, a parameter acquisition button B11, and a parameter setting button B12. Until parameters are acquired from the field device 2, it should be noted that nothing is displayed in the tree display area R1 or the parameter display area R2.

In the tree display area R1, function blocks of the field device 2 are displayed as a list with a tree format. Here, since the parameters of the field device 2 are hierarchically classified for each function block, the function blocks are displayed in the tree display area R1 in a tree format (a menu tree). In the parameter display area R2, names and values of parameters of function blocks selected by a user's operation from the function blocks displayed as the list in the tree display area R1 are displayed as a list. The values of the parameters displayed in the parameter display area R2 are modifiable by a user's operation.

The mode switching button B1 is used to switch an operation mode of the parameter display area R2 to an "execution mode" or an "editing mode." Here, in the "execution mode," the values of the parameters displayed in the parameter display area R2 are modifiable by a user's operation. In the "editing mode," the items of the parameters displayed in the parameter display area R2 are editable by a user's operation. For example, when a user changes the values of the parameters of the field device 2, the mode switching button B1 is switched to the "execution mode." When a user reduces the number of parameters displayed as the list in the parameter display area R2, the mode switching button B1 is switched to the "editing mode."

The parameter acquisition button B11 is used to instruct parameter acquisition from the field device 2. The parameter acquisition button B11 is pressed, so that the device information display apparatus 1 starts to communicate with the field device 2 and thus parameters are acquired from the field device 2. The parameter setting button B12 is used to instruct parameter setting for the field device 2. The parameter setting button B12 is pressed, so that the device information display apparatus 1 starts to communicate with the field device 2 and thus parameters having changed values in the parameter display area R2 are set in the field device 2.

Next, the operation of the device information display apparatus 1 with the above configuration will be described. For the purpose of convenience, it is assumed that the DD file F2 has been created in advance from the EDDL file F1 using the tokenizer T. First, a user performs connection work for connecting the field device 2, from which parameters are to be acquired, to the device information display apparatus 1 using the communication cable 3. After the connection work ends, if the device information display apparatus 1 is powered on and the program installed therein is activated, the functions of the DD analysis unit 11, the display parameter management unit 12, the display unit 13, the parameter setting unit 14, the communication unit 15, the display parameter changing unit 16, the display parameter generation unit 17, the definition file analysis unit 18, and the display parameter switching unit 19 illustrated in FIG. 2 are performed, and the window W1 including the tree display area R1 and the parameter display area R2, in which nothing is displayed, is displayed on the display device 1b.

Next, if a user presses the parameter acquisition button B11 provided on the window W1 by operating the input device 1a, the communication device 1c is controlled by the communication unit 15 and the device information display apparatus 1 starts to communicate with the field device 2 through the communication cable 3, so that the parameters of the field device 2 are acquired in the communication unit 15. Furthermore, the DD file F2 stored in the storage device 1e is read and analyzed by the DD analysis unit 11, so that access to the parameters of the field device 2 is possible.

If the analysis of the DD analysis unit 11 ends, the display parameter management unit 12 starts to manage the structure of the menus of the parameters to be displayed on the display device 1b and the list of the parameters to be displayed on the display device 1b. Then, based on information managed by the display parameter management unit 12, the display unit 13 graphically displays the function blocks of the field device 2 in the tree display area R1 of the window W1 in a menu format. Here, if a user selects the function blocks displayed in the tree display area R1 by operating the input device 1a, a list and values of selected parameters are displayed in the parameter display area R2 of the window W1.

When the mode switching button B1 has been switched to the "execution mode," if a user performs an operation for changing the values of the parameters displayed in the parameter display area R2 through the input device 1a, the values of the parameters according to a user's operation are changed by the parameter setting unit 14. After the values of the parameters are changed, if a user presses the parameter setting button B12 provided on the window W1 by operating the input device 1a, the communication device 1c is controlled by the communication unit 15 and the device information display apparatus 1 starts to communicate with the field device 2, so that the parameters having changed values in the parameter display area R2 are set in the field device 2.

Meanwhile, if a user switches the mode switching button B1 provided on the window W1 to the "editing mode" by operating the input device 1a, parameter changing according to the operation content of the input device 1a by the user is performed by the display parameter changing unit 16. For example, if a user performs an operation for selecting an entire area from the center to the bottom of the parameter display area R2 using the input device 1a, a selection area display S indicating a selected area is provided as illustrated in FIG. 3. In the state in which the selection area display S has been provided, if a user performs an operation such as a left click with respect to the input device 1a, a menu screen M provided with menu items such as "cut," "copy," or "paste" is displayed. If a user selects "cut" on the menu screen M, parameters displayed on the selection area display S are deleted by the display parameter changing unit 16.

After the above operation ends, if a user instructs the preservation of changed parameters, information indicating the parameters changed by the display parameter changing unit 16 is read from the display parameter management unit 12, and the display parameter definition file F3 is generated by the display parameter generation unit 17 and is stored in the storage device 1e. Then, for example, if a user switches the mode switching button B1 provided on the window W1 to the "execution mode" or to activate the program again by operating the input device 1a, the display parameter definition file F3 stored in the storage device 1e is read and analyzed by the definition file analysis unit 18, and the display of the parameter display area R2 is changed to display content including content changed by the display parameter switching unit 19.

Figure 4:
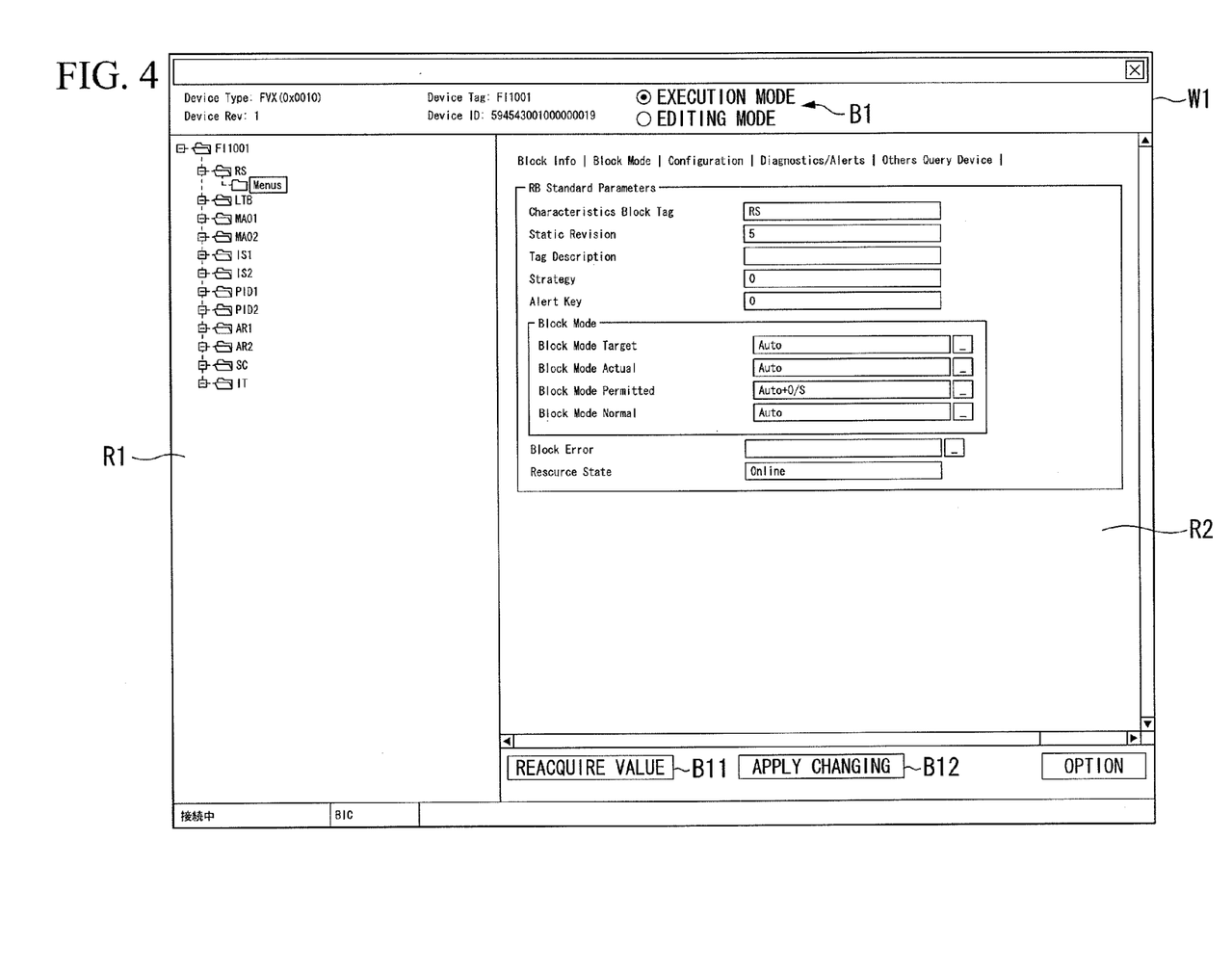
FIG. 4 is a diagram illustrating a modification example of the display content of the device information display apparatus in accordance with the first preferred embodiment of the present invention.

FIG. 4 is a diagram illustrating a modification example of the display content of the device information display apparatus in accordance with the first preferred embodiment of the present invention. As illustrated in FIG. 4, in the parameter display area R2 of the window W1, only the parameters displayed from the center to the top of the parameter display area R2 are displayed, and the parameters displayed on the selection area display S illustrated in FIG. 3 are deleted. In this way, a user switches the mode switching button B1 provided on the window W1 to the "editing mode," so that it is possible to freely change (customize) parameters to be displayed on the window W1 at a user's request.

As described above, according to the first preferred embodiment of the present invention, the display parameter changing unit 16 changes parameters to be displayed according to a user's operation instruction for the parameters on the window W1 displayed on the display device 1b, the display parameter generation unit 17 generates the display parameter definition file F3 for prescribing the parameters to be displayed based on content changed by the display parameter changing unit 16, and the display parameter switching unit 19 switches parameters to be displayed on the display device 1b based on the display parameter definition file F3. Consequently, it is possible to easily change device information to be displayed at a user's request, resulting in the improvement of operability.

In detail, it is possible for a user to perform parameter customization while referring to the parameters displayed on the window W1, so that parameters can be easily changed. Furthermore, if a plurality of display parameter definition files F3 are created in advance, since it is possible to switch parameters to be displayed on the display device 1b in a short time only by selecting the display parameter definition files F3, the usability is remarkably improved. Furthermore, an abnormal operation is reduced because it is possible to display only parameters necessary for a user, and time required for communication is also reduced through a reduction of the number of times of communication with the field device 2, so that it is possible to considerably improve working efficiency.

Furthermore, since the display parameter definition file F3 is managed separately from the DD file F2, even when the specifications of the field device 2 are changed, it is not necessary to re-create the display parameter definition file F3. Moreover, since the display parameter definition file F3 is created by analyzing the DD file F2, even when the EDDL file F1 is not provided from a vendor and the like, no problems occur.

Second Preferred Embodiment

Figure 5:
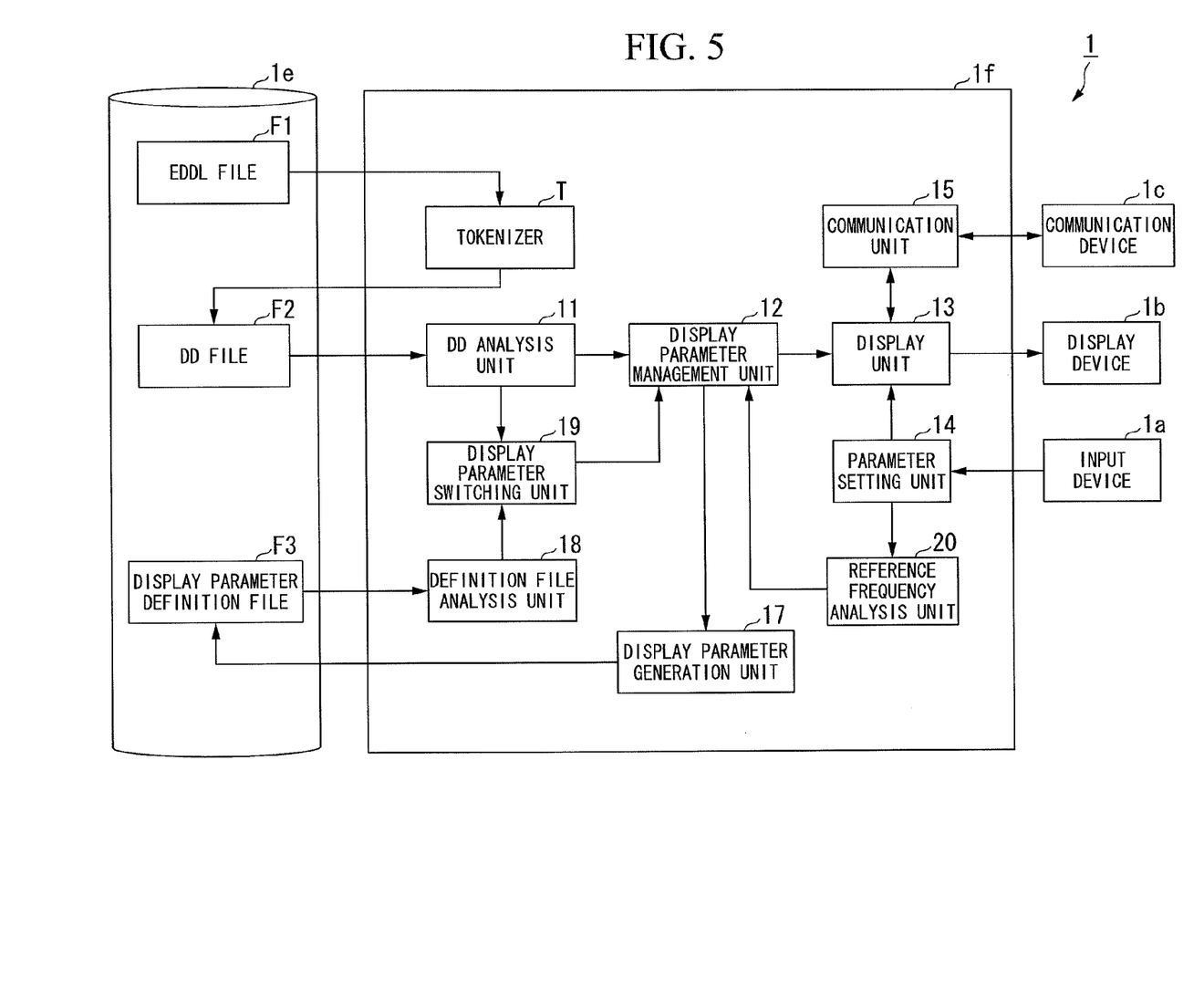
FIG. 5 is a block diagram illustrating a configuration of main elements of a device information display apparatus in accordance with a second preferred embodiment of the present invention.

FIG. 5 is a block diagram illustrating a configuration of main elements of a device information display apparatus in accordance with a second preferred embodiment of the present invention. As illustrated in FIG. 5, a device information display apparatus 1 of the second preferred embodiment of the present invention is substantially identical to the device information display apparatus 1 illustrated in FIG. 2, except that instead of the display parameter changing unit 16, a reference frequency analysis unit 20 (an analysis unit) is provided in the processing device 1f. The function of the reference frequency analysis unit 20 is also performed by reading and executing the program stored in the storage device 1e by the processing device 1f.

The reference frequency analysis unit 20 analyzes use frequency (reference frequency and setting frequency) of the parameters displayed on the display device 1b (the window W1) by a user. In detail, the reference frequency analysis unit 20 acquires and stores parameters, for which a reference operation or a setting operation has been performed through an operation of the input device 1a by a user, from the parameter setting unit 14, analyzes frequency of the reference operation or the setting operation for each parameter, and extracts a parameter with high frequency.

Here, the reference operation denotes an operation in which a user refers to the function blocks displayed in a tree format in the tree display area R1 of the window W1 illustrated in FIGS. 3 and 4, and the setting operation denotes an operation in which a user sets the values of the parameters displayed in the parameter display area R2 of the window W1. Furthermore, the parameter extraction, for example, is performed by setting a threshold value of the use frequency in advance, and extracting parameters with use frequency having exceeded the threshold value.

In the device information display apparatus 1 in which the reference frequency analysis unit 20 is provided, the reference frequency analysis unit 20 acquires information indicating parameters for which a user has performed the reference operation or the setting operation by operating the input device 1a. Then, the reference frequency analysis unit 20 analyzes use frequency of each parameter, extracts parameters with high use frequency, and outputs the extracted parameters to the display parameter management unit 12. In this way, parameters managed by the display parameter management unit 12 are changed, resulting in the changing of parameters to be displayed on the display device 1b. As illustrated in FIGS. 3 and 4, in the case where the mode switching button B1 has been provided on the window W1, when the mode switching button B1 is switched to the "execution mode," the analysis and extraction of the reference frequency analysis unit 20 are performed.

Information indicating the parameters with high use frequency is read from the display parameter management unit 12 to the display parameter generation unit 17. Next, the display parameter definition file F3 having stored the information indicating the parameters with high use frequency is generated by the display parameter generation unit 17 and is stored in the storage device 1e. Then, for example, if a user executes the program again, the display parameter definition file F3 stored in the storage device 1e is read and analyzed by the definition file analysis unit 18, and the display of the tree display area R1 and the parameter display area R2 is changed to display the parameters with high use frequency by the display parameter switching unit 19.

As described above, according to the second preferred embodiment of the present invention, the reference frequency analysis unit 20 is provided to analyze the use frequency (reference frequency and setting frequency) and extract the parameters with high use frequency, and parameters to be displayed on the window W1 are automatically customized based on the parameters extracted by the reference frequency analysis unit 20. Consequently, it is possible to reduce the amount of labor needed for customization. Furthermore, an abnormal operation is reduced because it is possible to display only the parameters with high use frequency, and time required for communication is also reduced through a reduction of the number of times of communication with the field device 2, so that it is possible to considerably improve working efficiency.

Third Preferred Embodiment

Figure 6:
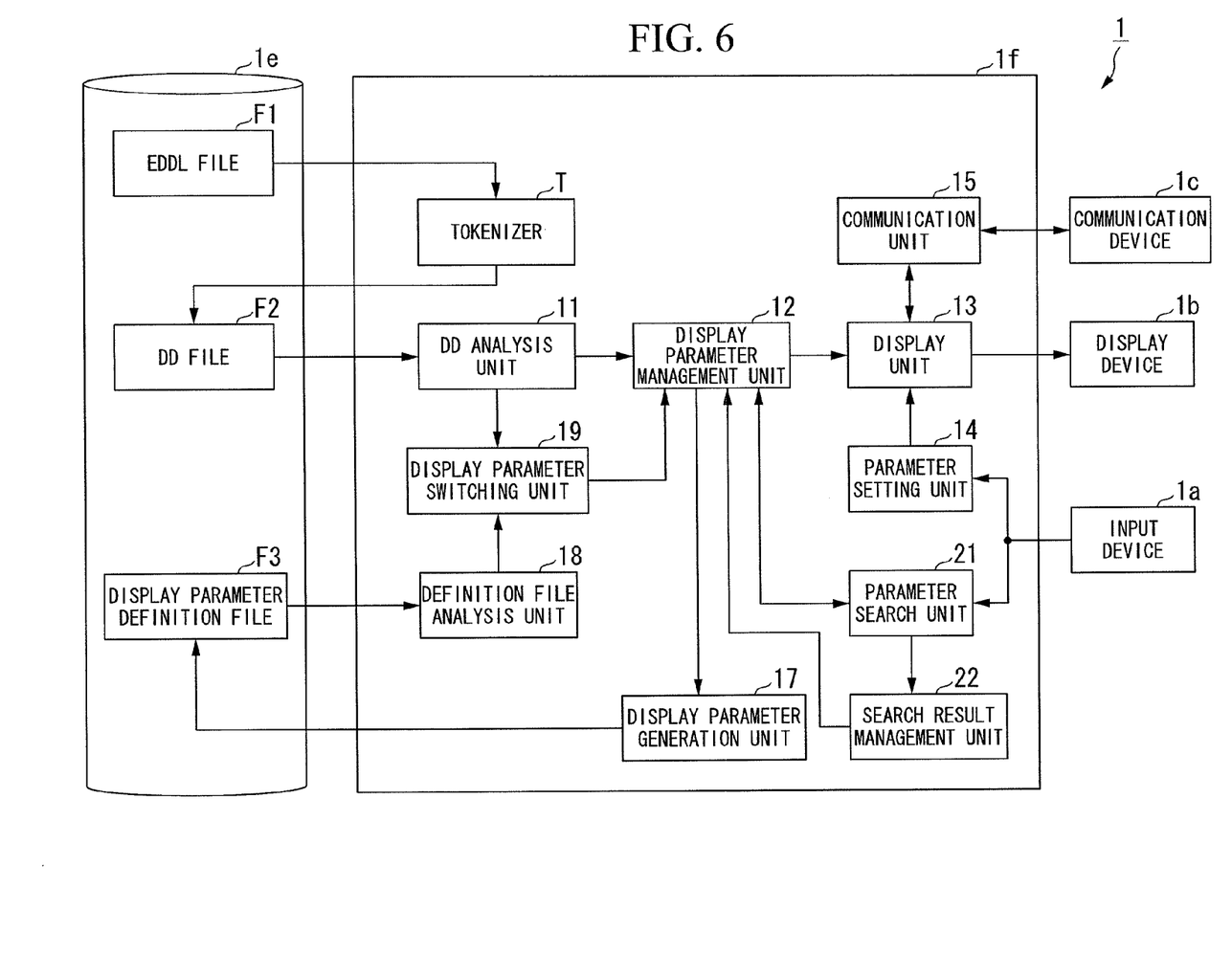
FIG. 6 is a block diagram illustrating a configuration of main elements of a device information display apparatus in accordance with a third preferred embodiment of the present invention.

FIG. 6 is a block diagram illustrating a configuration of main elements of a device information display apparatus in accordance with a third preferred embodiment of the present invention. As illustrated in FIG. 6, a device information display apparatus 1 of the third preferred embodiment of the present invention is substantially identical to the device information display apparatus 1 illustrated in FIG. 2, except that instead of the display parameter changing unit 16, a parameter search unit 21 (a search unit/search means) and a search result management unit 22 (a search result management means) are provided in the processing device 1f. The functions of the parameter search unit 21 and the search result management unit 22 are also performed by reading and executing the program stored in the storage device 1e by the processing device 1f.

The parameter search unit 21 searches for parameters associated with keywords instructed through an operation of the input device 1a by a user from parameters (parameters which can be displayed on the display device 1b) managed by the display parameter management unit 12. Here, the parameters associated with the keywords instructed by the user, for example, include parameters coinciding with the keywords, parameters including the keywords, and other parameters. The search result management unit 22 stores and manages a search result of the parameter search unit 21.

In the device information display apparatus 1 in which the parameter search unit 21 and the search result management unit 22 are provided, the window W1 illustrated in FIGS. 3 and 4 includes a search box (not illustrated), to which search keywords are input, and a search executing button (not illustrated). If a user inputs a keyword to the search box and presses the search executing button by operating the input device 1a, a parameter associated with the keyword input to the search box is searched by the parameter search unit 21 from the parameters managed by the display parameter management unit 12, and a search result is stored and managed by the search result management unit 22. As illustrated in FIGS. 3 and 4, in the state in which the mode switching button B1 has been provided on the window W1, when the mode switching button B1 is switched to the "execution mode," the search by the parameter search unit 21 is performed.

Information indicating the search result is output from the search result management unit 22 to the display parameter management unit 12. In this way, the parameters managed by the display parameter management unit 12 are changed, resulting in the changing of parameters to be displayed on the display device 1b. Furthermore, the information indicating the search result is read to the display parameter generation unit 17. Also, the display parameter definition file F3 having stored the information indicating the search result is generated by the display parameter generation unit 17 and is stored in the storage device 1e. Then, for example, if a user activates the program again, the display parameter definition file F3 stored in the storage device 1e is read and analyzed by the definition file analysis unit 18, and the display of the tree display area R1 and the parameter display area R2 is changed to display the searched parameters by the display parameter switching unit 19.

As described above, according to the third preferred embodiment of the present invention, the parameter search unit 21 is provided to search for parameters associated with keywords instructed by a user, the search result management unit 22 is provided to manage a search result, and parameters to be displayed on the window W1 are automatically customized based on the parameters searched by the parameter search unit 21. Consequently, it is possible to reduce the amount of labor needed for customization. Furthermore, an abnormal operation is reduced because it is possible to display only the parameters associated with the keywords instructed by a user, and time required for communication is also reduced through a reduction of the number of times of communication with the field device 2, so that it is possible to considerably improve working efficiency.

Fourth Preferred Embodiment

Figure 7:
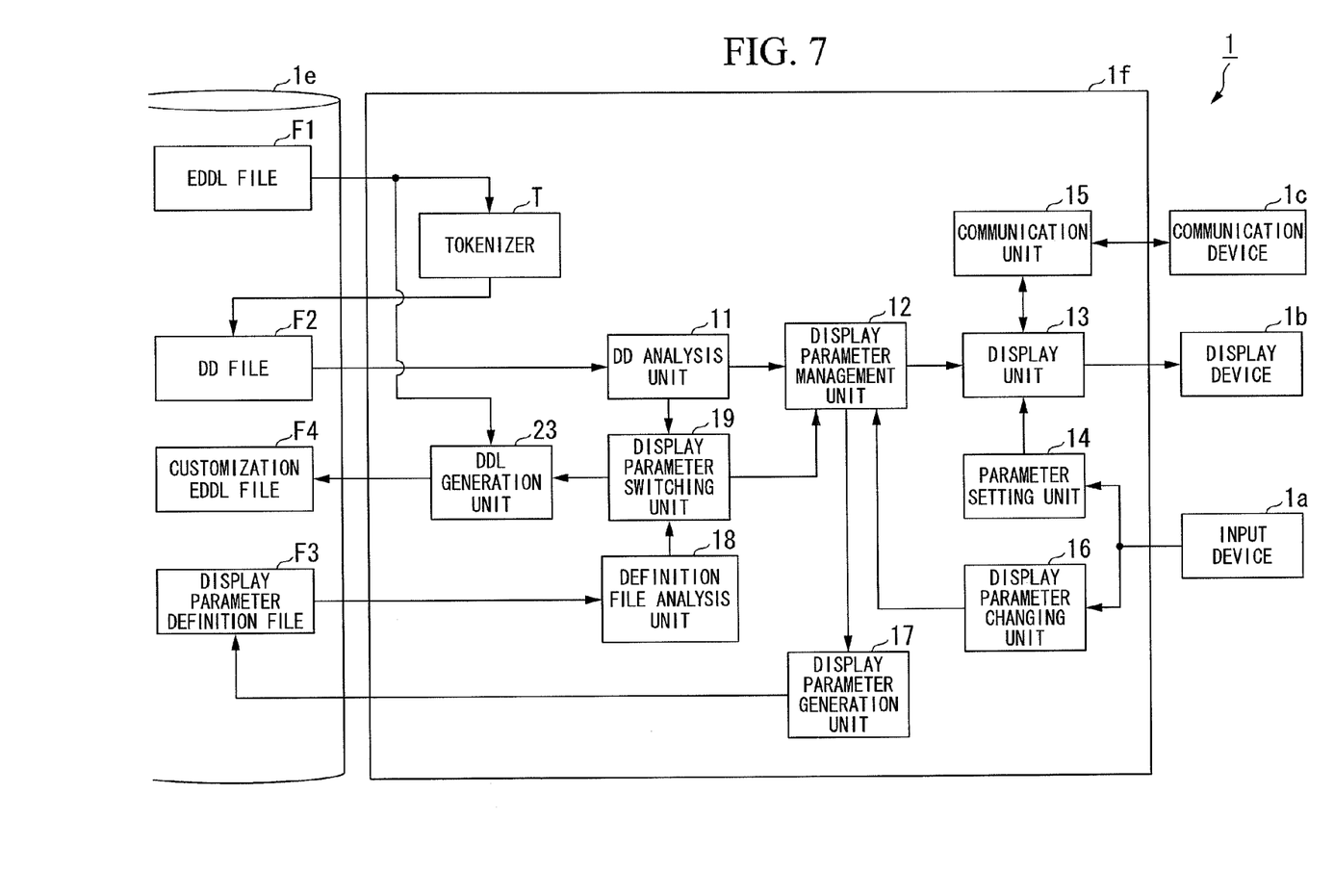
FIG. 7 is a block diagram illustrating a configuration of main elements of a device information display apparatus in accordance with a fourth preferred embodiment of the present invention.

FIG. 7 is a block diagram illustrating a configuration of main elements of a device information display apparatus in accordance with a fourth preferred embodiment of the present invention. As illustrated in FIG. 7, a device information display apparatus 1 of the fourth preferred embodiment of the present invention is substantially identical to the device information display apparatus 1 illustrated in FIG. 2, except that a DDL generation unit 23 (a display menu creation unit/display menu creation means) is newly provided in the processing device 1f. The function of the DDL generation unit 23 is also performed by reading and executing the program stored in the storage device 1e by the processing device 1f.

The DDL generation unit 23 generates a customization EDDL file F4 (a display menu file) based on the EDDL file F1 provided from a vendor and the like and the display parameter definition file F3 generated by the display parameter generation unit 17. That is, the content of the EDDL file F1 is not changed, and the customization EDDL file F4 is generated by reflecting the content of the display parameter definition file F3 in the EDDL file F1.

If a DD file is generated from the customization EDDL file F4 using the tokenizer T and is used in EDD-compatible tools (other devices for displaying device information acquired by communicating with a field device on a display device) provided from various vendors, it is possible to display parameters having customized content using these tools in the device information display apparatus 1. The device information display apparatus 1 illustrated in FIG. 7 has a configuration in which the function of the DDL generation unit 23 is added to the functions performed in the device information display apparatus 1 of the first preferred embodiment. However, it may be possible to add the function of the DDL generation unit 23 to the functions performed in the device information display apparatuses 1 of the second and third preferred embodiments.

As described above, according to the fourth preferred embodiment of the present invention, the DDL generation unit 23 is provided to generate the customization EDDL file F4 based on the EDDL file F1 provided from a vendor and the like and the display parameter definition file F3. Using the customization EDDL file F4 (the DD file) generated by the DDL generation unit 23, it is possible to display parameters having customized content using the EDD-compatible tools provided from various vendors in the device information display apparatus 1, resulting in the improvement of usability for tools other than the device information display apparatus 1.

So far, the device information display apparatus, the device information display program, and the storage device in accordance with the preferred embodiments of the present invention have been described. However, the present invention is not limited to the above-mentioned preferred embodiments and various modifications can be made within the scope of the present invention. For example, the preferred embodiments have been described using an example of accessing the parameters of the field device 2 by analyzing the DD file F2 created from the EDDL file F1 using the tokenizer T. However, without using the tokenizer T and the DD file F2, it may be possible to access the parameters of the field device 2 using an analysis unit provided in order to directly analyze the EDDL file F1. Furthermore, it may be possible to use a file with a general-purpose format capable of defining a hierarchical structure, such as an extensible markup language (XML) file, instead of the EDDL file F1.

In addition, the preferred embodiments have been described using an example of the device information display apparatus 1 that acquires parameters from the field device connected to the communication bus installed in a plant and the like, and displays the parameters. However, the present invention can also be applied to a device information display apparatus that acquires parameters from a field device (a wireless field device) for performing communication through a wireless network, and displays the parameters.

Moreover, the preferred embodiments have been described using an example in which the function of the device information display apparatus 1 is performed by software by reading and installing the program stored in the storage device M by the drive device 1*d*. However, the function of the device information display apparatus 1 may also be performed by installing a program (similar to the program stored in the storage device M) downloaded through a network such as the Internet into a computer. The function of the device information display apparatus 1 may also be performed by hardware.

The term "configured" is used to describe a component, unit or part of a device includes hardware and/or software that is constructed and/or programmed to carry out the desired function.

Moreover, terms that are expressed as "means-plus-function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A device information display apparatus comprising:
a communication unit configured to communicate with a field device;
a tokenizer configured to acquire a device information of the field device, which is described in a format of an EDDL file or an XML file, to create a DD file, the DD file being customized based on the EDDL file or the XML file;
a DD analysis unit configured to read the DD file and access the device information of the field device;
a display unit configured to display the accessed device information on a display device;
an analysis unit configured to analyze a reference frequency and a setting frequency of the device information displayed on the display device;
a display parameter management unit and a display parameter changing unit configured to manage and change the accessed device information to be displayed on the display device, the changing being performed based on operation instructions received from an input device;
a display parameter generation unit configured to generate a display parameter definition file for prescribing the accessed device information to be displayed on the display device, the generating being performed based on the device information changed by the display parameter management unit and the display parameter changing unit; and
a display parameter switching unit configured to switch the accessed device information to be displayed on the display device, the switching being performed based on the display parameter definition file generated by the display parameter generation unit.

2. The device information display apparatus according to claim 1,
wherein the display management unit and the display parameter changing unit are configured to extract a device information where reference frequency and setting frequency exceed a predetermined value based on an analysis result of the analysis unit and display the extracted device information on the display device.

3. The device information display apparatus according to claim 1, further comprising:
  a parameter search unit configured to search for a device information associated with keywords, which has been instructed through the operation instructions of the input device, from the device information, which has been managed by the display parameter management unit; and
  a search result management unit configured to store and manage a search result of the parameter search unit, wherein the display parameter management unit and the display parameter changing unit are configured to change the device information to be displayed on the display device, the changing being performed based on the search result managed by the search result management unit.

4. The device information display apparatus according to claim 1, further comprising:
  a display menu creation unit configured to create a display menu file based on the EDDL file and the display parameter definition file generated by the display parameter generation unit, the display menu file prescribing the accessed device information in order to display the accessed device information, which has been acquired by communicating with the field device, on the display device provided in another device.

5. The device information display apparatus according to claim 1, wherein
  the communication unit is configured to acquire the accessed device information by controlling a communication device to communicate with the field device.

6. The device information display apparatus according to claim 4, further comprising:
  a storage device configured to store an EDDL file, which is a text formation file that describes the device information of the field device and is capable of hierarchically defining the device information based on characteristics or attributes of the field device, the DD file, which is obtained by converting the EDDL file into a binary format file treatable in the device information display apparatus, and the display parameter definition file.

7. The device information display apparatus according to claim 6, wherein the storage device stores the EDDL file, the DD file and the display parameter definition file in different areas respectively and manages the EDDL file, the DD file and the display parameter definition file.

8. The device information display apparatus according to claim 6, wherein
  the tokenizer is configured to create the DD file from the EDDL file.

9. The device information display apparatus according to claim 8, wherein
  the storage device is configured to store the display menu file, and
  the tokenizer is configured to create the DD file from the display menu file.

10. The device information display apparatus according to claim 1, wherein the display device is configured to display a window comprising:
  a tree display area that for displaying function blocks of the field device as a list with a tree format;
  a parameter display area for displaying names and values of parameters of function blocks selected by a user's operation from the function blocks displayed as the list in the tree display area as a list;
  a mode switching button used to switch an operation mode of the parameter display area;
  a parameter acquisition button used to instruct parameter acquisition from the field device; and
  a parameter setting button used to instruct parameter setting for the field device.

11. A non-transitory computer-readable storage medium storing a device information display program for causing a computer to serve as:
  a communication unit for communicating with a field device;
  a tokenizer for acquiring a device information of the field device, which is described in a format of an EDDL file or an XML file, to create a DD file, the DD file being customized based on the EDDL file or the XML file;
  a DD analysis unit for reading the DD file and accessing the device information of the field device;
  a display unit for displaying the accessed device information on a display device;
  an analysis unit configured to analyze a reference frequency and a setting frequency of the device information displayed on the display device;
  a display parameter management unit and a display parameter changing unit for changing the accessed device information to be displayed on the display device, the changing being performed based on operation instructions received from an input device;
  a display parameter generation unit for generating a display parameter definition file for prescribing the accessed device information to be displayed on the display device, the generating being performed based on the device information changed by the display parameter management unit and the display parameter changing unit; and
  a display parameter switching unit for switching the accessed device information to be displayed on the display device, the switching being performed based on the display parameter definition file generated by the display parameter generation unit.

12. A device information display method comprising:
  communicating with a field device;
  acquiring a device information of the field device, which is described in a format of an EDDL file or an XML file, to create a DD file, the DD file being customized based on the EDDL file or the XML file;
  reading the DD file
  accessing the device information of the field device;
  displaying the accessed device information on a display device;
  analyzing a reference frequency and a setting frequency of the accessed device information displayed on the display device;
  managing and changing the accessed device information to be displayed on the display device, the changing being performed based on operation instructions received from an input device;
  generating a display parameter definition file for prescribing the accessed device information to be displayed on the display device, the generating being performed based on the device information that has been changed; and
  switching the accessed device information to be displayed on the display device, the switching being performed based on the display parameter definition file that has been generated.

13. The device information display method according to claim 12, further comprising:
  analyzing a reference frequency and a setting frequency of the device information displayed on the display device;

extracting a device information where reference frequency and setting frequency exceed a predetermined value based on an analysis result of the analyzing; and displaying the extracted device information on the display device.

14. The device information display method according to claim 12, further comprising:

searching for a device information associated with keywords, which has been instructed through the operation instructions of the input device, from the device information, which has been managed;

storing and managing a search result of the searching; and changing the device information to be displayed on the display device, the changing being performed based on the search result that is managed.

15. The device information display method according to claim 12, further comprising:

creating a display menu file based on the EDDL file and the display parameter definition file that has been generated, the display menu file prescribing the accessed device information in order to display the accessed device information, which has been acquired by communicating with the field device, on the display device provided in another device.

16. The device information display method according to claim 15, further comprising:

storing an EDDL file, which is a text formation file that describes the device information of the field device and is capable of hierarchically defining the device information based on characteristics or attributes of the field device, the DD file, which is obtained by converting the EDDL file into a binary format file treatable in the device information display apparatus, and the display parameter definition file.

17. The device information display method according to claim 15, further comprising:

storing an EDDL file, which is a text formation file that describes the device information of the field device and is capable of hierarchically defining the device information based on characteristics or attributes of the field device, a DD file, which is obtained by converting the EDDL file into a binary format file treatable in the device information display apparatus, and the display parameter definition file in different areas respectively.

18. The device information display method according to claim 16, further comprising:

creating the DD file from the EDDL file.

19. The device information display method according to claim 18, further comprising:

storing the display menu file; and creating the DD file from the display menu file.

20. The device information display method according to claim 12, further comprising:

displaying function blocks of the field device as a list with a tree format;

displaying names and values of parameters of function blocks selected by a user's operation from the function blocks, which are displayed as the list;

switching an operation mode of the displaying as the list;

instructing parameter acquisition from the field device; and instructing parameter setting for the field device.

* * * * *